United States Patent [19]

Hand et al.

[11] 4,145,719
[45] Mar. 20, 1979

[54] MULTI-CHANNEL VIDEO SWITCH USING DUAL-GATE MOS-FETS

[75] Inventors: Wilfred L. Hand, Clarence; Craig W. Brun, Honeoye Falls, both of N.Y.

[73] Assignee: GTE Sylvania Incorporated, Stamford, Conn.

[21] Appl. No.: 837,315

[22] Filed: Sep. 28, 1977

[51] Int. Cl.² .................. H04N 5/22; H03K 17/56; H03K 3/353
[52] U.S. Cl. .................. 358/183; 307/243; 307/304
[58] Field of Search .......... 358/183, 188; 307/243, 307/251, 214, 318, 304

[56] References Cited
U.S. PATENT DOCUMENTS 3,736,377  5/1973  Warren, Jr. et al. .......... 358/183

FOREIGN PATENT DOCUMENTS 2431006  8/1976  Fed. Rep. of Germany .......... 307/251

OTHER PUBLICATIONS

"JCs End the 'Drive Gap' in FET Analog Signal Switching", Electron Design 26, Nov. 22, 1966, pp. 50-54.

Primary Examiner—Robert L. Griffin
Assistant Examiner—Aristotelis M. Psitos
Attorney, Agent, or Firm—Theodore D. Lindgren

[57] ABSTRACT

A high-speed, solid-state, electronic circuit for alternately coupling two separate video signal paths to a third video signal path in response to high frequency square wave excitation, the circuit utilizing two dual-gate metal oxide semiconductor field effect transistors having oppositely phased signals applied to respective switching gates for cancellation of switching transient signals.

1 Claim, 3 Drawing Figures

MULTI-CHANNEL VIDEO SWITCH USING DUAL-GATE MOS-FETS

FIELD OF THE INVENTION

This invention relates to a high-speed, solid-state, electronic video switching circuit responsive to high-frequency, square-wave switching signals. More particularly, the circuit of this invention relates to a high-speed switch for alternately connecting two separate video signal paths to a third video signal path in a manner which minimizes coupling of switching signal energy into said video paths.

BACKGROUND OF THE INVENTION

The development of time domain filtering techniques for television receiver circuits as well as the development of circuitry for simultaneous display on separate parts of the screen of parts of signals received from two television broadcast stations has created a requirement for an inexpensive video-signal switch capable of alternately connecting two separate video signal paths to a third video signal path at horizontal sweep frequency rates or multiples thereof. Necessarily, the switching at the required high frequency must be done electronically rather than mechanically. However, electronic switching at rapid rates generally requires use of semiconductor components having either junction or field effect phenomena for alternately transmitting and blocking high frequency signal passage and the use in switching circuits of such semiconductor components with junction phenomena generally results in some direct coupling of the switching signal energy into the signal path as the semiconductor junction is alternately forward biased and reverse biased. Additionally, the switching time of such devices is limited by the time required to inject and remove majority carriers into and out of the junction regions.

On the other hand, the use in switching circuits of semiconductor components with field effect phenomena results in capacitive-type coupling of the switching signal energy into the video signal paths because of the nature of the injection and removal of minority carriers into and out of the changing geometry of the non-conducting regions within such devices. Therefore, the frequency of switching of such devices is not limited by time required for injection and removal of majority carriers in circuits using junction devices. While use of field effect devices has resulted in faster switching rates, a problem heretofore existing has concerned minimization of the effect of the capacitive-type coupling while utilizing such devices.

SUMMARY OF THE INVENTION

In accordance with the present invention a video switch circuit provides alternate connection of two separate video signal paths to a third video signal path using a pair of dual-gate metal oxide semiconductor field effect transistors, (MOS-FETs). Oppositely phased switching signals are transmitted to the two MOS-FET devices, each of the devices is coupled to a separate video signal path and each of the devices is connected to a common third video signal path. As a result, the switching signal energy injected into the video signal output through one of the MOS-FET devices is substantially canceled by switching signal energy removed from the video signal output through the other MOS-FET device.

DESCRIPTION OF THE PREFERRED EMBODIMENT

Figure 1:
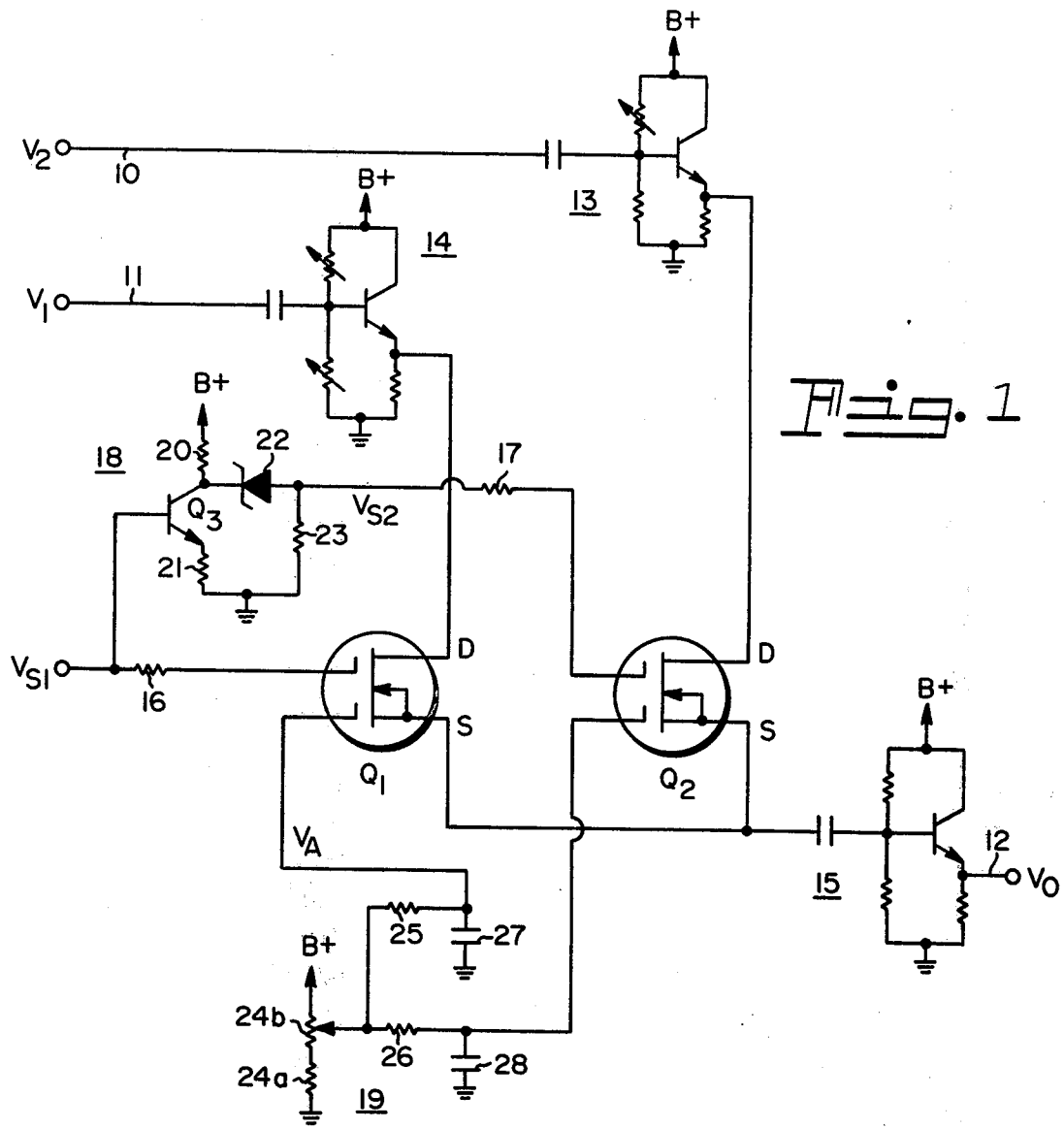
FIG. 1 is a schematic diagram of a preferred embodiment of the video switch of the present invention.

In the embodiment indicated in FIG. 1 the video switch circuit has input terminals 10 and 11 for receiving a video signal from two separate sources (not shown). The video signals may be comprised of television broadcast signals processed by a television tuner-detector to frequencies ranging from 30Hz to 4.5 MHz. The output of the video switch circuit is indicated by the reference terminal 12 and may be applied to the video processing and driving circuits of a television receiver. Inputs 10 and 11 and output 12 are referenced with respect to ground.

First and second video signal paths $V_1$ and $V_2$ are A.C. coupled to first terminals of the source-drain paths of dual-gate metal oxide semiconductor field effect transistors (MOS-FETs) $Q_1$ and $Q_2$, respectively, through optional buffer amplifiers 13 and 14. Second terminals of the source-drain paths of MOS-FETs $Q_1$ and $Q_2$ are shown D.C. coupled to each other and A.C. coupled to optional output buffer amplifier 15. Optional output amplifier 15 is coupled to third video path $V_O$. The first terminals of the source-drain paths of $Q_1$ and $Q_2$ may be either the source connections or the drain connections of the device, with the opposite connections used for the second terminals.

Switching signal $V_{S1}$ is D.C. coupled to the first of the two gate terminals of MOS-FET $Q_1$ through optional protective resistor 16. An oppositely phased switching signal $V_{S2}$ is D.C. coupled to the first of the two gate terminals of MOS-FET $Q_2$ through optional protective resistor 17. Switching signal phase inversion means 18 may be used to convert switching signal $V_{S1}$ to oppositely phased switching signal $V_{S2}$.

The term switching signal as used herein is defined to mean a time-varying substantially square wave voltage which is applied to a first gate of either of said MOS-FET devices and which has a lower voltage level $V_L$ such that, with reference to the voltage level of the source-drain path of the device, level $V_L$ is of sufficient magnitude to cause the said source-drain path to become essentially non-conductive. Similarly, the switching signal has a higher voltage level $V_H$ which in reference to said source-drain voltage is sufficient to cause said source-drain path to become highly conductive. The magnitudes of $V_H$ and $V_L$ must, of course, be sufficient to hold the source-drain path substantially conductive or non-conductive as the voltage of said path varies according to the applied video signal voltage.

Figure 2:
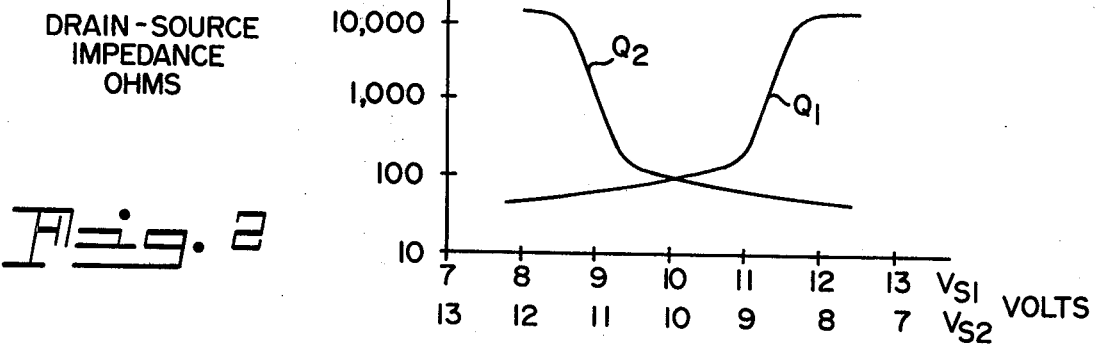
FIG. 2 is a graphic illustration of the switching characteristics of the gate elements of the switch circuit of the present invention.
Figure 3:
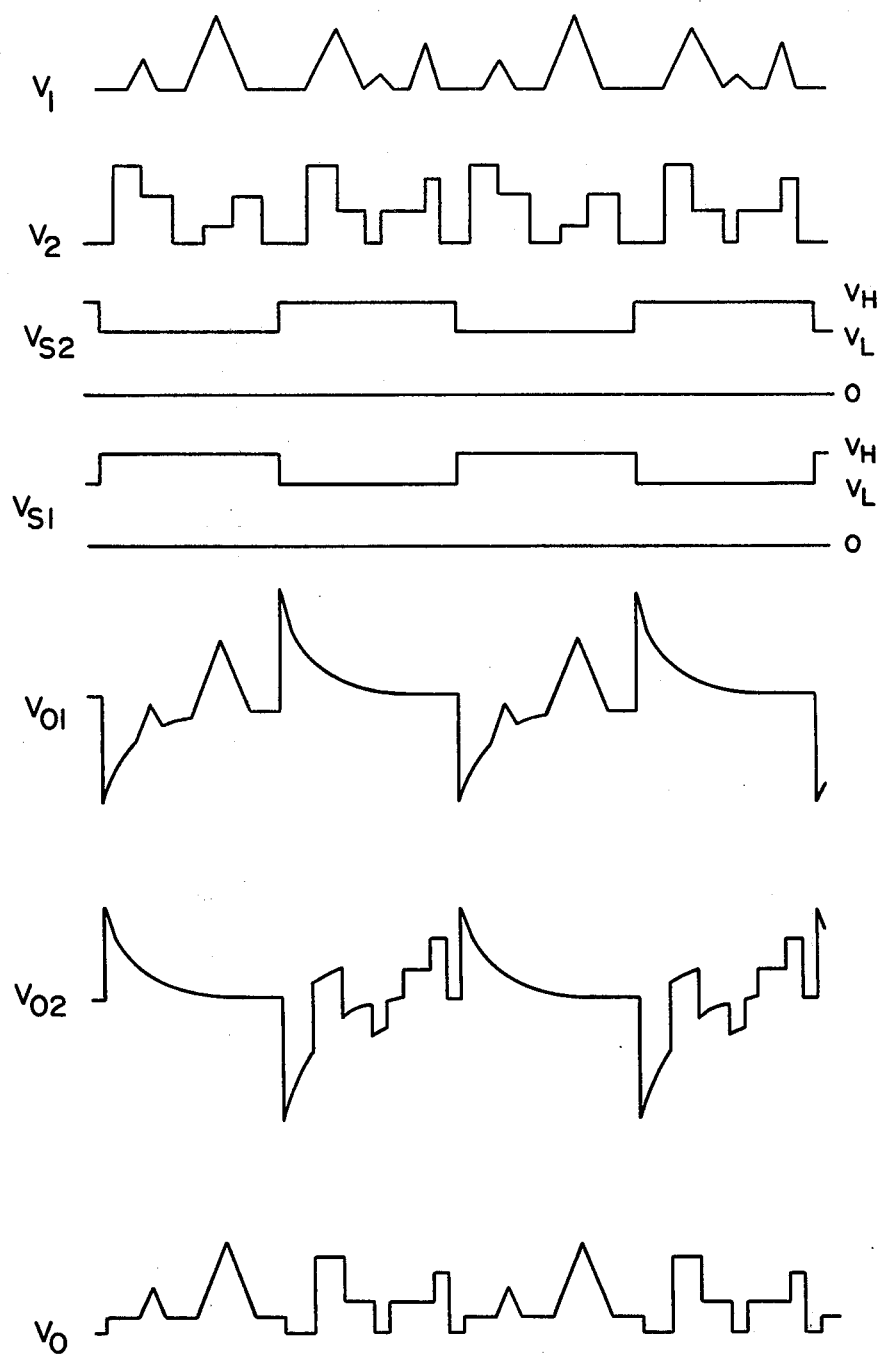
FIG. 3 is a time domain representation of example video and switching signals illustrating the manner of operation of the video switch of this invention.

Switching signals $V_{S1}$ and $V_{S2}$ may be comprised of square-wave voltage as illustrated in FIG. 3 and may vary between a higher voltage level $V_H$ and a lower voltage level $V_L$. To minimize switching time required by MOS-FETs $Q_1$ and $Q_2$ the characteristics of those devices should be such that maximum impedance change occurs in the source-drain path for minimum change in level of switching signal. A family of curves such as that illustrated in FIG. 2 may be obtained for various fixed values of voltage $V_A$ applied by D.C. voltage potential means 19 to the second gate terminals of dual-gate MOS-FETs $Q_1$ and $Q_2$. For example, using a pair of commonly available 3N201 MOS-FETs for $Q_1$ and $Q_2$, the curves illustrated in FIG. 2 illustrate switching conditions with a bias voltage $V_A$ equal to approximately 14 volts and a drain-source voltage of approximately 10 volts, all voltages referenced to a common ground. The particular curves indicate that the switching voltages $V_{S1}$ and $V_{S2}$ may alternate between a lower voltage level $V_L$ equal to 8 volts and a higher voltage level $V_H$ equal to 12 volts. The foregoing switching signal levels were experimentally determined to be of sufficient amplitude for switching signals having a 200 milli-volt peak-to-peak amplitude.

The term bias voltage as used herein is defined to mean a voltage $V_A$ applied to the second gate of said MOS-FET devices which voltage as measured with respect to the voltages of the source-drain paths and the switching signal is of value which substantially optimizes switching time.

The operation of the circuit is illustrated by FIG. 3 in which $V_1$ and $V_2$ are straight-line representations which in each case may be a horizontal line or part of a horizontal line of a video signal. Switching voltages $V_{S1}$ and $V_{S2}$ are indicated in FIG. 3 as oppositely phased square-wave voltages varying between the values $V_H$ and $V_L$ as described above. The graph illustrated as $V_{O1}$ is representative of the output of MOS-FET $Q_1$ as it might be if the first gate of $Q_2$ was biased continuously at $V_H$ rather than switched with signal $V_{S1}$. Similarly, the graph illustrated as $V_{O2}$ is representative of the output of MOS-FET $Q_2$ with the first gate MOS-FET $Q_1$ biased continuously at $V_H$ rather than switched with signal $V_{S2}$. The decaying exponential components of the waveforms of curves $V_{O1}$ and $V_{O2}$ represent switching signal energy coupled into the video path by the time varying capacitive nature of the geometry between the signal-drain path and the depletion region of the MOS-FET devices. It is noted that the exponential components of waveforms and the time constants of FIG. 3 are illustrations rendered for the purpose of using superposition theory to explain the principles of operation of the video signal switch. The true waveforms vary from those illustrated. Accordingly, the final output of the switch is illustrated as $V_O$ and is the sum of $V_{O1}$ and $V_{O2}$. The illustrated waveforms indicate that the switching signal energy coupled to the video signal paths as exemplified by exponential components of waveforms of $V_{O1}$ and $V_{O2}$ is canceled from the resulting output voltage $V_O$.

Thus, in the video switch of this invention, equal amplitude signals $V_{S1}$ and $V_{S2}$ of opposite phase are applied to substantially identical MOS-FET devices $Q_1$ and $Q_2$, resulting in substantially equal but opposite instantaneous switching signal energy transmission into and out of the video signal path. Therefore, the transmitted switching signal impulses from $V_{S1}$ and $V_{S2}$ are substantially canceled from the output $V_O$.

Obviously, the difference between D.C. voltage levels applied to source and drain terminals and gate terminals of MOS-FET devices is critical. However, the applied voltages may all be measured from a different reference level which may depend upon the driving or the output circuits used. In the embodiment illustrated, the source-drain terminals have a D.C. voltage of approximately 10 volts established by the emitter-follower buffer amplifiers. The second gate terminal voltage value of 14 volts and the switching signal voltage levels of 8 and 12 volts were established after arbitrarily choosing the source-drain voltage value. A lower source-drain voltage would, of course, require design using correspondingly lower gate-terminal voltages.

Signal phase inversion means 18 may be comprised of three-terminal transistor $Q_3$ with switching signal $V_{S1}$ coupled directly to the base terminal. Collector resistor 20 is coupled between the collector terminal of $Q_3$ and a potential source of value equal to at least the sum of twice $V_H$ because of transistor biasing limitation. Emitter resistor 21 is coupled between the emitter terminal of $Q_3$ and zero voltage reference level, usually ground. For example, if resistors 20 and 21 are both chosen to be 1000 ohms and if the potential source is chosen to be 24 volts, the collector voltage will alternate between values of 16 and 12 volts as the switching voltage $V_{S1}$ alternates between values of 8 and 12 volts. Zener diode 22 in series with zener conduction resistor 23 may be used to lower the switching output voltage by the value of the potential source less $V_H + V_L$ or, for example, to lower the voltage from the 16 and 12 volt levels to the desired 12 and 8 volt levels. The cathode terminal of Zener diode 22 is connected to the collector terminal of $Q_3$ and the anode terminal is connected to one terminal of resistor 23, and the other terminal of resistor 23 is connected to ground potential. The junction of Zener diode 22 and resistor 23 is coupled to the first gate of $Q_2$ through optional protective resistor 17.

Buffer amplifiers 12, 13 and 14 are indicated in FIG. 1 as commonly used emitter follower circuits. The collector-base bias resistor may, for example, be approximately 14,000 ohms and the base-ground bias resistor approximately 9,000 ohms when used with a standard transistor, a 2,000 ohm emitter resistor and a 24 volt power supply. Certain bias resistors of amplifiers 13 and 14 are indicated as being variable to provide equalization or optimization of the D.C. voltage applied to the source-drain terminals of $Q_3$ and $Q_4$.

Voltage potential means 19 may be comprised of the series combination comprising resistor 24a and a tapped resistor or trimming means 24b connected between a potential source and ground. The tapped voltage $V_A$ may be applied to the second gate terminals of $Q_1$ and $Q_2$ through resistors 25 and 26 and may be adjusted to partially close the source-drain path, thereby decreasing switching time and required energy. Signal transmission between second terminals of $Q_1$ and $Q_2$ may be prevented by use of shunt capacitors 27 and 28.

While there has been described what is at present considered to be the preferred embodiment of the invention, it will be obvious to those skilled in the art that various changes and modifications may be made therein without departing from the invention as defined by the appended claims.

We claim:

1. A video signal switching circuit for alternately coupling first and second video signal paths to a third video signal path in response to a high-frequency, a switching signal means for generating a square-wave switching signal having a lower switching voltage level and a higher switching voltage level comprising:
   first and second dual-gate metal oxide semiconductor field effect transistors, each of said transistors having first and second gate terminals and having a source-drain path with a first and second terminal;

said first terminals of source-drain paths of said first and second dual-gate transistors respectively coupled to said first and second video signal paths;

said second terminals of said source-drain paths of said dual-gate transistors coupled to each other and to said third video path;

said first gate terminal of said first dual-gate transistor coupled to said switching signal means;

voltage potential means coupled to each of said second gates of said dual-gate transistors;

a switching signal phase inversion means coupled to said switching signal means; and said first gate terminal of said second dual-gate transistor coupled to said switching signal phase inversion means wherein said switching signal phase inversion means comprises:

a three terminal transistor with base terminal connected directly to said switching signal;

an emitter resistor with a terminal connected to the emitter terminal of said three-terminal transistor and with another terminal connected to a zero voltage reference;

a collector resistor of equal resistive value to said emitter resistor with a terminal connected to the collector terminal of said three-terminal transistor and with another terminal connected to a voltage potential equal to at least twice said higher voltage level;

a zener diode having a breakdown voltage substantially equal to the value of said voltage potential less the sum of said lower switching voltage level and said higher switching voltage level with cathode terminal of said diode also connected to said collector terminal of said three-terminal transistor and with anode terminal of said diode connected to said first gate terminal of said second dual-gate transistor; and a zener-conduction resistor having one terminal also connected to said anode terminal of said diode and having another terminal connected to said zero voltage reference.

* * * * *